United States Patent
Shaffer et al.

(10) Patent No.: US 7,087,862 B1
(45) Date of Patent: Aug. 8, 2006

(54) METHODS AND APPARATUS FOR ASSEMBLING COOKING APPLIANCES

(75) Inventors: Timothy Scott Shaffer, La Grange, KY (US); Anthony Leo Muth, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/081,921

(22) Filed: Mar. 16, 2005

(51) Int. Cl.
*F24C 15/16* (2006.01)

(52) U.S. Cl. .................... 219/392; 219/391; 126/333; 126/339; 99/450

(58) Field of Classification Search .................... None
See application file for complete search history.

(56) References Cited

U.S. PATENT DOCUMENTS

| | | | | |
|---|---|---|---|---|
| 3,115,395 A | * | 12/1963 | Putt et al. .................... | 428/623 |
| 3,427,244 A | * | 2/1969 | Boes ............................ | 75/230 |
| 3,567,504 A | * | 3/1971 | Hopkins .................. | 428/320.2 |
| 3,936,627 A | | 2/1976 | Fitzmayer | |
| 4,651,713 A | | 3/1987 | Ondrasik, II | |
| 5,393,440 A | * | 2/1995 | Roller et al. ................. | 508/106 |
| 5,486,052 A | * | 1/1996 | Sibley et al. ................. | 384/463 |
| 5,965,253 A | * | 10/1999 | Rechberger et al. ........ | 428/336 |
| 6,148,813 A | | 11/2000 | Barnes et al. | |
| 6,789,861 B1 | * | 9/2004 | Dobberstein ............. | 312/330.1 |
| 6,854,379 B1 | * | 2/2005 | Pattle et al. .................. | 99/393 |
| 6,938,617 B1 | * | 9/2005 | Le et al. ..................... | 126/339 |
| 2004/0003726 A1 | * | 1/2004 | Geberzahn et al. ........... | 99/426 |
| 2004/0069299 A1 | | 4/2004 | Le et al. | |
| 2004/0112371 A1 | | 6/2004 | Le et al. | |
| 2004/0261785 A1 | * | 12/2004 | Wiedenmann et al. ...... | 126/339 |

FOREIGN PATENT DOCUMENTS

| | | | |
|---|---|---|---|
| DE | 19951267 A1 | * | 5/2001 |
| DE | 10247192 A1 | * | 4/2004 |
| WO | WO2004025186 A1 | * | 3/2004 |

* cited by examiner

*Primary Examiner*—Joseph Pelham
(74) *Attorney, Agent, or Firm*—Armstrong Teasdale LLP

(57) ABSTRACT

A rack assembly includes a pair of laterally spaced inner rails, wherein each inner rail includes a coating layer configured to withstand a self clean oven temperature, and a pair of laterally spaced outer rails, wherein each outer rail is slidably coupled to a corresponding inner rail, and each outer rail includes a coating layer configured to withstand a self clean oven temperature. The rack assembly also includes a plurality of bearings positioned between the inner rails and the outer rails, a lubricant to facilitate movement between the plurality of bearings and at least one of the inner rails and the outer rails, wherein the lubricant is configured to withstand a self clean oven temperature, and a cooking rack coupled to each inner rail.

19 Claims, 4 Drawing Sheets

METHODS AND APPARATUS FOR ASSEMBLING COOKING APPLIANCES

BACKGROUND OF THE INVENTION

This invention relates generally to methods and apparatus for assembling cooking appliances, and, more particularly, to rack slides for self clean ovens.

At least some known ovens includes multiple heating elements that are used for multiple operations, such as, for instance, baking, broiling, and self-cleaning. Substances baked or broiled inside an oven cavity may generate materials, such as, for example, grease, which over time becomes undesirably deposited within the oven cavity and/or any apparatuses used within the oven cavity such as, for example, oven racks. Operating the self-cleaning function of the oven facilitates removing such deposited materials.

Ovens typically include at least one rack within the oven cavity to support items being cooked by the oven. In at least some known ovens, the oven rack is supported by, and is in direct contact with a porcelain oven rib. The pull-out forces required for these known oven racks are often greater than ten pounds of force. As such, at least some known ovens include rack slides to facilitate increasing the overall ease of sliding the oven racks into and/or out of the oven cavity. These known rack slides utilize an oil or grease based lubricant to facilitate the sliding action of the rack slides.

However, cleaning these ovens having known rack slides can be problematic. Specifically, due to the high temperatures associated with an oven in a self clean mode of operation, the known rack slides have a reduction in lubricity after the oven is operated in the self clean mode of operation. More specifically, oxidation under the high temperatures causes the lubrication to deteriorate and/or disappear. As such, the known rack slides must be removed prior to operating the self clean mode of operation in the oven. The rack slides do not allow a self-cleaning mode of operation without removal of the rack slides, and failure to remove the rack slides from the oven cavity prior to the self-cleaning mode may result in damage to the rack slides. Having to remove the rack slides from the oven cavity prior to the self-cleaning mode may result in annoyance to the user.

BRIEF DESCRIPTION OF THE INVENTION

In one aspect, a rack assembly is provided including a pair of laterally spaced inner rails, wherein each inner rail includes a coating layer configured to withstand a self clean oven temperature, and a pair of laterally spaced outer rails, wherein each outer rail is slidably coupled to a corresponding inner rail, and each outer rail includes a coating layer configured to withstand a self clean oven temperature. The rack assembly also includes a plurality of bearings positioned between the inner rails and the outer rails, a lubricant to facilitate movement between the plurality of bearings and at least one of the inner rails and the outer rails, wherein the lubricant is configured to withstand a self clean oven temperature, and a cooking rack coupled to each inner rail.

In another aspect, an oven assembly is provided including a main body defining an oven cavity therein, at least one heating element capable of heating the oven cavity to a self clean oven temperature, at least one cooking rack, and at least one rack assembly within said oven cavity and configured to support the at least one cooking rack. Each rack assembly includes a pair of laterally spaced inner rails comprising a coating layer configured to withstand the self clean oven temperature, and a pair of laterally spaced outer rails slidably coupled to a corresponding said inner rail, each said outer rail comprising a coating layer configured to withstand the self clean oven temperature. Each rack assembly also includes a plurality of bearings positioned between said inner rails and said outer rails, and a dry film lubricant to facilitate movement between said plurality of bearings and at least one of said inner rails and said outer rails.

In a further aspect, a method of assembling an oven assembly is provided. The method includes providing at least one rack assembly, wherein each rack assembly includes a pair of laterally spaced inner rails, a pair of laterally spaced outer rails, and a plurality of bearings. The method also includes coating each rail with a material configured to withstand a self clean oven temperature, slidably coupling each inner rail to a respective outer rails, positioning the ball bearings between the inner and outer rails, and lubricating the ball bearings with a lubricant configured to withstand a self clean oven temperature. The method also includes coupling an oven rack to each inner rail.

DETAILED DESCRIPTION OF THE INVENTION

Figure 1:
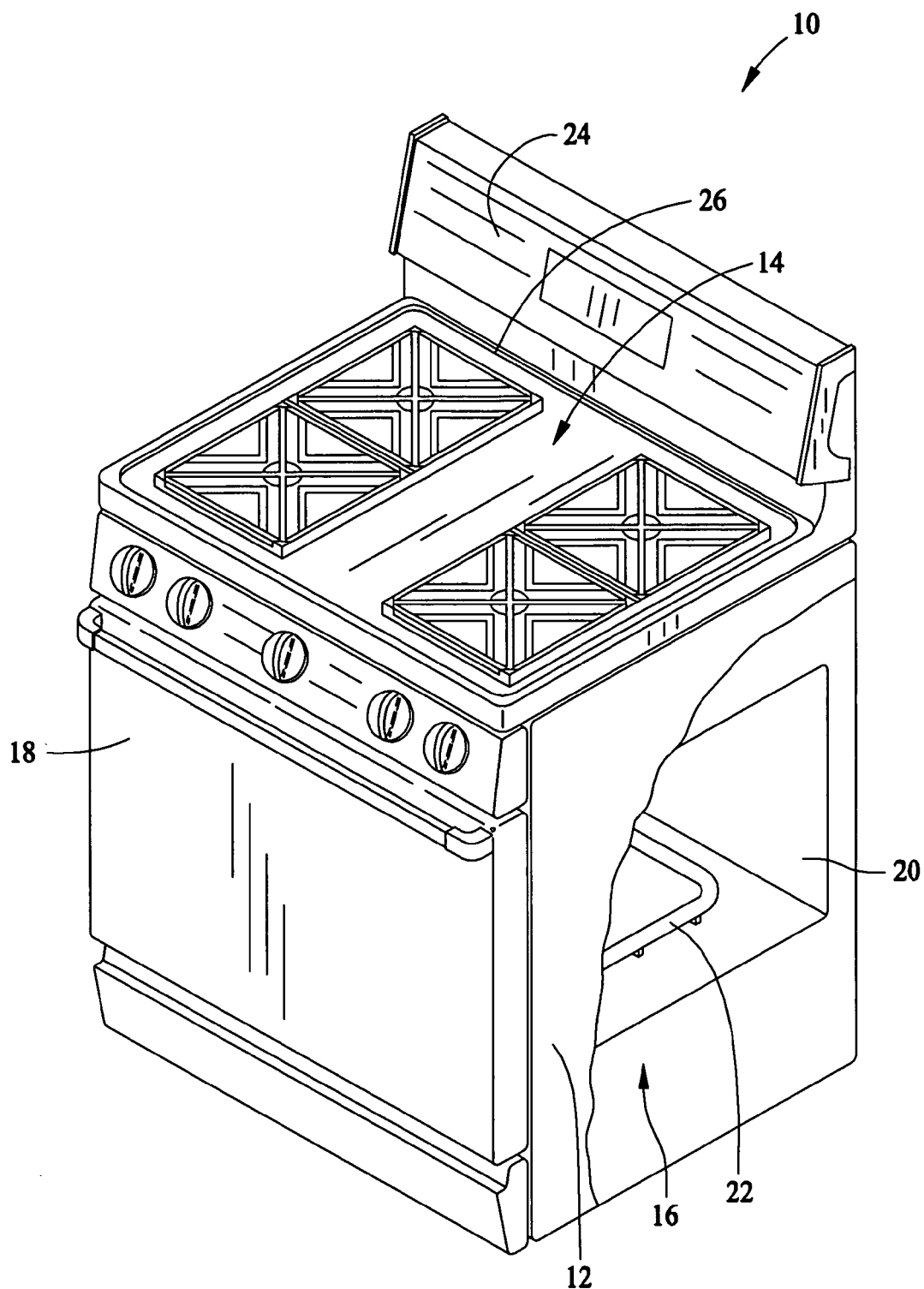
FIG. 1 illustrates an exemplary cooking appliance.

FIG. 1 illustrates an exemplary cooking appliance in the form of a free standing gas range 10 including an outer body or cabinet 12 that incorporates a generally rectangular cooktop 14. An oven 16 is positioned below cooktop 14 and has a front-opening access door 18. Oven 16 defines an oven cavity 20 therein, and a heating element 22 positioned within oven cavity 20. A range backsplash 24 extends upward from a rear edge 26 of cooktop 14 and contains various control selectors (not shown) for selecting operative features of heating elements for cooktop 14 and oven 16. In the exemplary embodiment, oven 16 is operable in a self-cleaning mode of operation. As such, heating element 22 is capable of heating oven cavity 20 to a temperature between approximately eight hundred and a thousand degrees Fahrenheit.

It is contemplated that the present invention is applicable, not only to cooking appliances which form the lower portion of a range, such as range 10, but to other forms of cooking appliances as well, such as, but not limited to, wall-mounted ovens. Therefore, gas range 10 is provided by way of illustration rather than limitation, and accordingly there is no intention to limit application of the present invention to any particular appliance or cooktop, such as range 10 or oven 16. In addition, it is contemplated that the present invention is applicable to electric cooking appliances or duel fuel cooking appliances, e.g., a gas cooktop with an electric oven. The construction and operation of the cooking appliance heating elements are believed to be within the purview of those in the art without further discussion.

Figure 2:
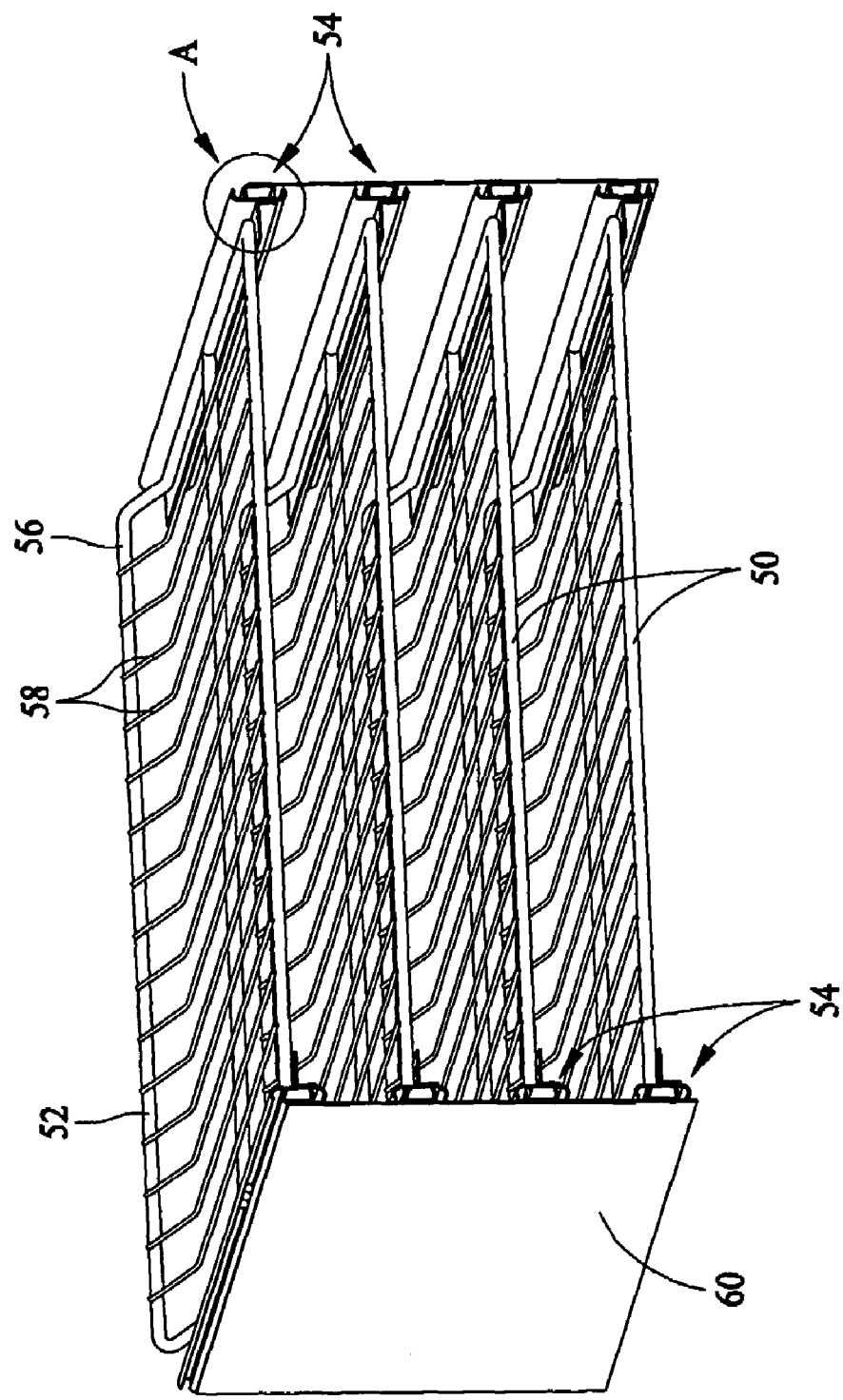
FIG. 2 is a perspective view of a plurality of exemplary rack assemblies for use with the cooking appliance shown in FIG. 1.

FIG. 2 is a perspective view of a plurality of exemplary rack assemblies 50 for use in oven 16 (shown in FIG. 1). Rack assemblies 50 are illustrated in a retracted state. In use, as will be described in more detail below, rack assemblies 50 are operable in an extended state. In one embodiment, oven 16 includes four rack assemblies 50 arranged in parallel with one another. In alternative embodiments, oven 16 includes more or less than four rack assemblies 50.

Each rack assembly 50 includes a cooking rack 52 and a pair of laterally spaced rail assemblies 54. Cooking rack 52 includes a rack frame 56 supporting a plurality of bars 58 thereon. Bars 58 facilitate supporting items to be cooked in oven cavity 20 (shown in FIG. 1). In the exemplary embodiment, cooking rack 52 is fabricated from a porcelain steel material. In alternative embodiments, cooking rack 52 is fabricated from another material, such as, but not limited to, a carbon steel, or stainless steel material. In other alternative embodiments, cooking rack 52 is coated with a coating layer including a material such as, but not limited to, porcelain enamel, tungsten disulfide, titanium nitride, or the like. In one embodiment, cooking rack 52 is coated using a plating process, such that a chrome-nickel plating is applied to an exterior surface of cooking rack 52. In the exemplary embodiment, cooking rack 52 is capable of withstanding self cleaning oven temperatures, such as, for examples, temperatures greater than eight hundred and fifty degrees Fahrenheit.

In the exemplary embodiment, cooking rack 52 is coupled to rail assemblies 54 at opposing sides of cooking rack 52. In one embodiment, cooking rack 52 is removably coupled to rail assemblies 54 such that cooking rack 52 may be removed when not in use. Alternatively, oven 16 includes less than four cooking racks 52 such that a user may determine which pair of rail assemblies 54 to use for a particular application.

In one embodiment, a pair of laterally spaced slide coupler plates 60 are coupled to an inner wall (not shown) of oven 16. Each pair of rail assemblies 54 is coupled to coupler plates 60 such that rack assemblies 50 are mounted in parallel in oven cavity 20.

Figure 3:
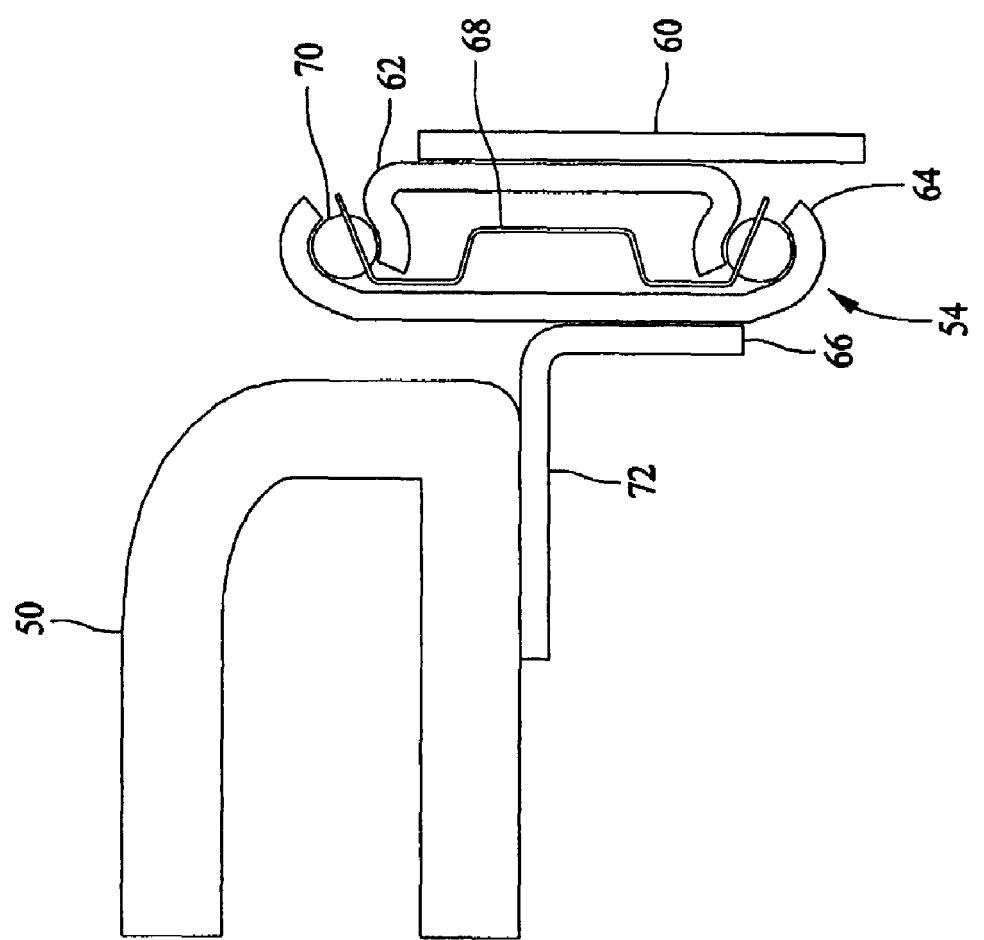
FIG. 3 is an enlarged view of Area A shown in FIG. 2.

FIG. 3 is an enlarged view of Area A shown in FIG. 2. In the exemplary embodiment, each rail assembly 54 includes an outer rail 62, an inner rail 64, a plurality of ball bearings 66 and a bearing rack 68 to facilitate orienting and supporting ball bearings 66 between inner rail 64 and outer rail 62. Outer rail 62 is slidably positioned with respect to inner rail 64. Specifically, outer rail 62 and inner rail 64 define a ball bearing gap 70 such that ball bearings 66 are rotatably positioned within the elongated space defined by gap 70. Ball bearings 66 facilitate sliding movement between outer and inner rails 62 and 64, respectively. In the exemplary embodiment, a rack ledge 72 is coupled to inner rail 64. Rack ledge 72 facilitates supporting cooking rack 52.

In the exemplary embodiment, outer rail 62 is fixedly coupled to slide coupler plate 60. As such, when rack assembly 50 is in use, outer rail 62 does not move with respect to oven cavity 20 (shown in FIG. 1). Rather, inner rail 64 slides outwardly from oven cavity 20 so that a user can have better access to cooking rack 52. In an alternative embodiment, outer and inner rails 62 and 64 are interchangeable, such that inner rail 64 is coupled to slide coupler plate 60, and outer rail 62 is coupled to rack ledge 72 and/or cooking rack 52.

In the exemplary embodiment, outer rail 62 and inner rail 64 are fabricated from a carbon steel material. In alternative embodiments, outer rail 62 and inner rail 64 are fabricated from other materials such as, but not limited to, a stainless steel material or a ceramic material. In one embodiment, a coating layer (not shown) capable of withstanding oven cleaning temperatures in excess of approximately eight hundred degrees Fahrenheit is applied to the exterior surface of each of outer rail 62 and inner rail 64. In one embodiment, the coating layer includes tungsten disulfide. In alternative embodiments, the coating layer includes another material such as, but not limited to, porcelain enamel, bonded graphite, titanium nitride, or the like. The coating layer facilitates darkening the exterior surface of rails 62 and 64. The coating layer also facilitates enhancing the affinity of lubricants to adhere to the exterior surface of rails 62 and 64. In one embodiment, the coating layer is applied during a treatment process, such as, for example, a diffusion process, that facilitates increasing the hardness, reducing the friction, and/or reduces the effects of chipping, flaking and peeling of the exterior surface of rails 62 and 64. In the exemplary embodiment, the diffusion process deposits a thin outer layer of epsilon nitrides and carbides of the base material. This thin outer layer facilitates isolating the base material from the oxygen in the oven cavity 20, thus reducing oxidation. In another embodiment, another process such as, but not limited to, a spraying process or a dipping process is utilized to provide the coating layer.

In the exemplary embodiment, ball bearings 66 are fabricated from a stainless steel material. In alternative embodiments, ball bearings 66 are fabricated from other materials such as, but not limited to, a carbon steel material or a ceramic material. In one embodiment, ball bearings 66 have a coating layer such as, for example, a bonded graphite coating to facilitate enhancing movement between rails 62 and 64.

A lubricant is provided to facilitate enhancing movement between ball bearings 66 and at least one of outer and inner rails 62 and 64. In the exemplary embodiment, the lubricant is a dry film lubricant. In one embodiment, the lubricant includes a graphite material. In alternative embodiments, the lubricant includes another material such as, but not limited to, a tungsten disulfide material or a molybdenum disulfide material. In one embodiment, the lubricant includes a bonded dry film lubricant.

Figure 4:
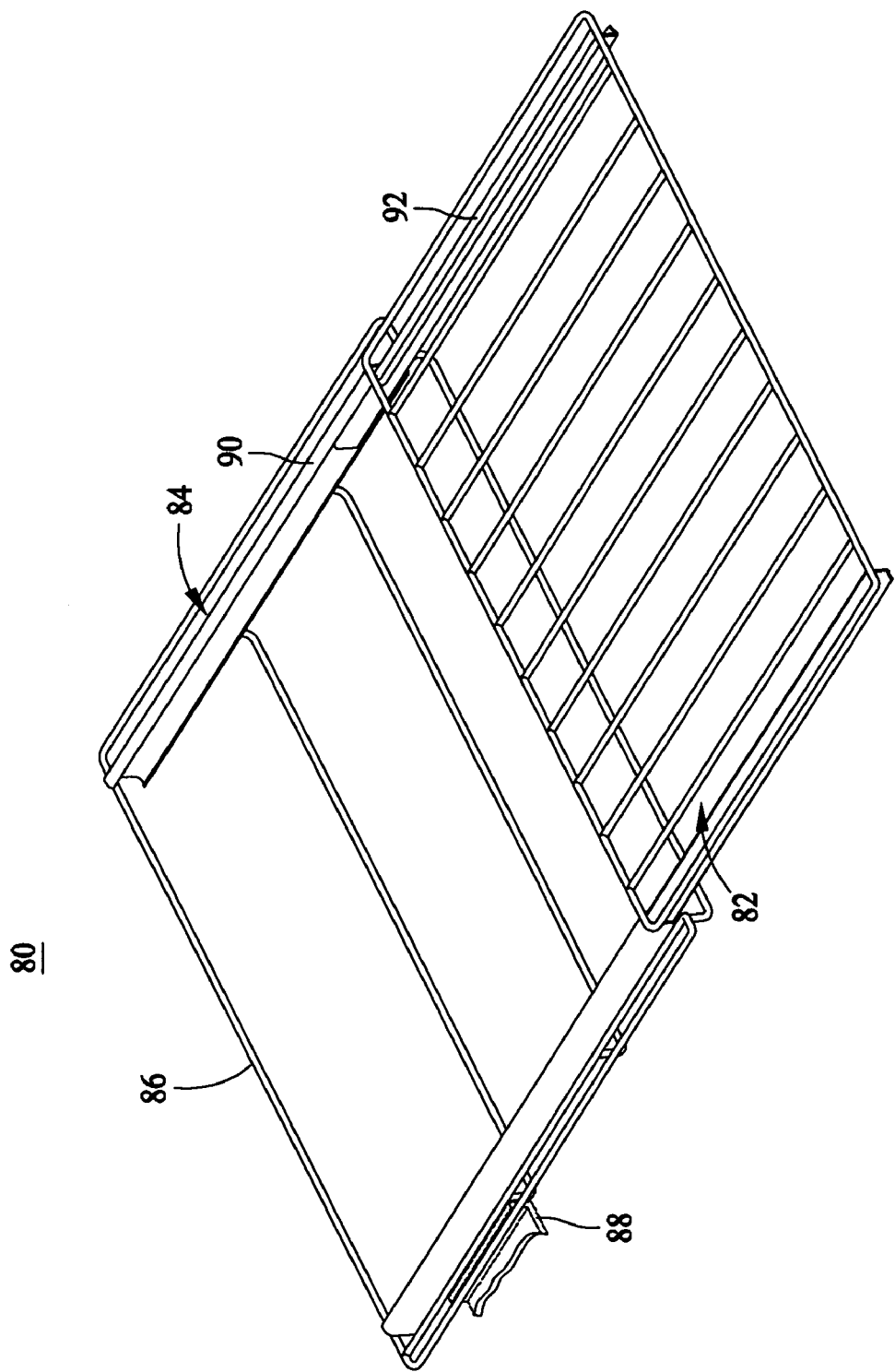
FIG. 4 is a perspective view of an alternative rack assembly that may be used with the cooking appliance shown in FIG. 1.

FIG. 4 is a perspective view of an alternative rack assembly 80 for use with oven 16 (shown in FIG. 1). In the exemplary embodiment, rack assembly 80 is capable of withstanding self cleaning oven temperatures. As illustrated in FIG. 4, rack assembly 80 is in an extended state. In use, rack assembly 80 is positionable in a retracted state.

Rack assembly 80 includes a cooking rack 82 and a pair of laterally spaced rail assemblies 84 coupled to cooking rack 82. Rack assembly 80 also includes a support rack 86 positioned below cooking rack 82. In the exemplary embodiment, support rack 86 is sized to be positioned within oven cavity 20 (shown in FIG. 1). Specifically, support rack 86 is sized to be supported by ribs 88 extending from an inner wall (not shown) of oven 16. More specifically, support rack 86 has a substantially similar size and shape to a conventional cooking rack such that support rack 86 may be utilized in a conventional oven.

In the exemplary embodiment, rail assemblies 84 include outer rails 90 and inner rails 92 that are substantially similar to outer and inner rails 62 and 64 (shown in FIG. 3) in fabrication and operation. Outer rails 90 are coupled to support rack 86. Cooking rack 82 is coupled to inner rails 92. In one embodiment, a rack ledge (not shown) is coupled to each inner rail 92 to facilitate supporting cooking rack 82. Inner rails 92 are slidable with respect to outer rails 90 such that cooking rack 82 is moveable between an extended position and a retracted position.

In the exemplary embodiment, rack assemblies 50 and/or 80 are assembled in the following manner. Prior to assembly, each rail assembly 54 is pre-treated with a coating layer capable of withstanding a self clean oven temperature. In one embodiment, the coating layer facilitates reducing oxidation. In another embodiment, the coating layer facilitate enhancing the affinity of lubricants to adhere to the outer surface of rail assemblies 54. In one embodiment, the coating is applied using a process such as, for example, a diffusion process. In another embodiment, another process is utilized such as, but not limited to, a spraying process or a dipping process. During assembly, outer and inner rails 62 and 64 are slidably coupled to one another. Ball bearings 66 are positioned between outer and inner rails 62 and 64. In one embodiment, pre-lubricated ball bearings 66 are used to facilitate enhancing the sliding action between outer and inner rails 62 and 64. A lubricant is applied to rails 62 and 64 and/or ball bearings 66. The lubricant is a dry film lubricant capable of withstanding self cleaning temperatures within oven cavity 20. Cooking rack 52 is then coupled to rail assemblies 54. In operation, cooking rack 52 is movable between an extended position and a retracted position to facilitate accessing cooking rack 52.

An oven is thus provided which allows for the self cleaning of rack assemblies in a cost effective and reliable manner. The oven includes rack assemblies having a cooking rack supported by a pair of laterally spaced rail assemblies. The rail assemblies include inner rails slidably coupled to outer rails and ball bearings positioned therebetween. In one embodiment, the rail assemblies are coupled to a coupler plate, previously shown and described with reference to FIG. 3. In another embodiment, the rail assemblies are coupled to a support rack, previously shown and described with reference to FIG. 4. In the exemplary embodiment, the rail assemblies include a coating layer for reducing oxidation. Additionally, the rail assemblies utilize a lubricant such as, for example, a dry lubricant. As a result, the rack assemblies are configured to withstand self cleaning oven temperatures. Accordingly, the rack assemblies do not need to be removed during the self cleaning mode of operation of the oven.

Exemplary embodiments of combinations of apparatuses and methods are described above in detail. The combinations are not limited to the specific embodiments described herein, but rather, components of each apparatus and method may be utilized independently and separately from other components described herein.

While the invention has been described in terms of various specific embodiments, those skilled in the art will recognize that the invention can be practiced with modification within the spirit and scope of the claims.

What is claimed is:

1. A rack assembly comprising:
a pair of laterally spaced inner rails, each of said inner rails comprising an outer surface having a coating layer substantially covering said outer surface and configured to withstand a self clean oven temperature;
a pair of laterally spaced outer rails slidably coupled to a corresponding said inner rail, each said outer rail comprising an outer surface having a coating layer substantially covering said outer surface and configured to withstand a self clean oven temperature;
a plurality of bearings positioned between said inner rails and said outer rails;
a lubricant to facilitate movement between said plurality of bearings and at least one of said inner rails and said outer rails, said lubricant configured to withstand a self clean oven temperature; and
a cooking rack coupled to each said inner rail.

2. A rack assembly in accordance with claim 1 wherein said outer rails are stationary and said inner rails are movable with respect to said outer rails.

3. A rack assembly in accordance with claim 1 wherein said outer rails are coupled to an oven wall.

4. A rack assembly in accordance with claim 1 further comprising a pair of laterally spaced slide coupler plates, each said coupler plate coupled to an interior portion of an oven wall, said outer rails are coupled to a corresponding one of said coupler plates.

5. A rack assembly in accordance with claim 1 further comprising a support rack configured to be coupled within an oven, each said outer rail coupled to said support rack.

6. A rack assembly in accordance with claim 1 wherein said self clean oven temperature is at least eight hundred and fifty degrees Fahrenheit.

7. A rack assembly in accordance with claim 1 wherein said coating layer comprises at least one of porcelain enamel material, tungsten disulfide material, bonded graphite material, and titanium nitride material.

8. A rack assembly in accordance with claim 1 wherein said lubricant comprises a dry film lubricant.

9. An oven assembly comprising:
a main body defining an oven cavity therein;
at least one heating element capable of heating said oven cavity to a self clean oven temperature;
at least one cooking rack; and
at least one rack assembly within said oven cavity and configured to support a respective one of said at least one cooking rack, each said rack assembly comprising:
a pair of laterally spaced inner rails, each of said inner rails comprising an outer surface having a coating layer substantially covering said outer surface and configured to withstand a self clean oven temperature;
a pair of laterally spaced outer rails slidably coupled to a corresponding said inner rail, each said outer rail comprising an outer surface having a coating layer substantially covering said outer surface and configured to withstand a self clean oven temperature;
a plurality of bearings positioned between said inner rails and said outer rails; and
a dry film lubricant to facilitate movement between said plurality of bearings and at least one of said inner rails and said outer rails.

10. An oven assembly in accordance with claim 9 further comprising a pair of laterally spaced slide coupler plates coupled to an inner surface of said oven body, said outer rails coupled to said coupler plates.

11. An oven assembly in accordance with claim 9 further comprising a support rack configured to be coupled within an oven, each said outer rail coupled to said support rack.

12. An oven assembly in accordance with claim 9 wherein each said coating layer comprises at least one of porcelain enamel material, tungsten disulfide material, and titanium nitride material.

13. An oven assembly in accordance with claim 9 wherein said lubricant comprises at least one of tungsten disulfide material, graphite material, and molybdenum disulfide material.

14. An oven assembly in accordance with claim 9 wherein each said bearing comprises at least one of stainless steel material and ceramic material.

15. A method of assembling an oven assembly, said method comprising:
providing at least one rack assembly, wherein each rack assembly includes a pair of laterally spaced inner rails, a pair of laterally spaced outer rails, and a plurality of bearings, wherein each of the inner rails includes a coating layer substantially covering the inner rail and each of the outer rails includes a coating layer substantially covering the outer rail, wherein the coating layers are configured to withstand a self clean oven temperature;

slidably coupling each inner rail to a respective outer rail;

positioning the ball bearings between the inner and outer rails;

lubricating the ball bearings with a lubricant configured to withstand a self clean oven temperature; and coupling an oven rack to each inner rail.

16. A method in accordance with claim 15 wherein said providing at least one rack assembly comprises providing at least one rack assembly wherein each rail includes a coating layer including at least one of porcelain enamel material, tungsten disulfide material, bonded graphite material, and titanium nitride material.

17. A method in accordance with claim 15 wherein said lubricating the ball bearings with a lubricant comprises lubricating the ball bearings with a lubricant including at least one of tungsten disulfide material, graphite material, and molybdenum disulfide material.

18. A method in accordance with claim 15 further comprising:

coupling a pair of laterally spaced slide coupler plates to an interior wall of the oven; and coupling the at least one rack assembly to the slide coupler plates.

19. A method in accordance with claim 15 wherein said providing at least one rack assembly comprises providing a support rack configured to be slidably coupled within an interior portion of the oven, said method further comprises coupling each outer rail to the support rack.

* * * * *